US012756960B2

(12) United States Patent
Sun

(10) Patent No.: US 12,756,960 B2
(45) Date of Patent: Oct. 6, 2026

(54) SWITCH SYSTEM, SWITCH APPARATUS, AND LINEAR DRIVE PLUGGABLE OPTICS APPARATUS

(71) Applicant: JESS-LINK PRODUCTS CO., LTD., New Taipei City (TW)

(72) Inventor: Chi-Hsien Sun, New Taipei City (TW)

(73) Assignee: JESS-LINK PRODUCTS CO., LTD., New Taipei City (TW)

( * ) Notice: Subject to any disclaimer, the term of this patent is extended or adjusted under 35 U.S.C. 154(b) by 212 days.

(21) Appl. No.: 18/772,779

(22) Filed: Jul. 15, 2024

(65) Prior Publication Data

US 2025/0373962 A1 Dec. 4, 2025

(30) Foreign Application Priority Data

Jun. 3, 2024 (TW) ................................ 113120463

(51) Int. Cl.
*H04B 10/40* (2013.01)
*H04Q 11/00* (2006.01)

(52) U.S. Cl.
CPC ......... *H04Q 11/0005* (2013.01); *H04B 10/40* (2013.01); *H04Q 2011/0035* (2013.01); *H04Q 2011/0039* (2013.01); *H04Q 2011/0049* (2013.01); *H04Q 2213/003* (2013.01)

(58) Field of Classification Search
CPC ....... H04Q 11/0005; H04Q 2011/0035; H04Q 2011/0039; H04Q 2011/0049; H04Q 2213/003; G06F 13/387; G06F 13/4022; G06F 13/4068; H04B 10/801; H04B 10/40
USPC ......................... 398/9–38, 43–103, 135–139
See application file for complete search history.

(56) References Cited

U.S. PATENT DOCUMENTS

| | | | | |
|---|---|---|---|---|
| 7,934,032 | B1 * | 4/2011 | Sardella | G06F 13/4022 710/316 |
| 9,735,876 | B2 * | 8/2017 | Duthel | H04B 10/40 |
| 9,900,103 | B1 * | 2/2018 | Lee | H04Q 11/0066 |
| 2004/0151073 | A1 * | 8/2004 | Preisach | H04B 10/40 368/110 |
| 2007/0072451 | A1 * | 3/2007 | Tazawa | H04L 43/00 439/76.1 |
| 2009/0168858 | A1 * | 7/2009 | Luo | H04B 10/40 398/25 |
| 2010/0061069 | A1 * | 3/2010 | Cole | G02B 6/4284 361/761 |

(Continued)

*Primary Examiner* — Dibson J Sanchez
(74) *Attorney, Agent, or Firm* — HDLS IPR SERVICES; Chun-Ming Shih

(57) ABSTRACT

A switch system (10) includes a switch apparatus (102) and a linear drive pluggable optics apparatus (108). The switch apparatus (102) includes a digital signal processor (104) and a lookup table (106). The linear drive pluggable optics apparatus (108) includes a microprocessor (110). The microprocessor (110) transmits an identification code (112) to the digital signal processor (104). The digital signal processor (104) searches the lookup table (106) for an optoelectronic parameter (114) corresponding to a connection port number (124) of the linear drive pluggable optics apparatus (108) and the identification code (112). The digital signal processor (104) transmits the optoelectronic parameter (114) to the microprocessor (110). The microprocessor (110) controls the linear drive pluggable optics apparatus (108) with the optoelectronic parameter (114).

4 Claims, 3 Drawing Sheets

(56) References Cited

U.S. PATENT DOCUMENTS

| | | | | |
|---|---|---|---|---|
| 2015/0200837 | A1* | 7/2015 | McCallen | H04L 43/50 370/242 |
| 2018/0062749 | A1* | 3/2018 | Rector | H04B 10/07955 |
| 2018/0101392 | A1* | 4/2018 | Chew | G06F 9/4406 |
| 2020/0073196 | A1* | 3/2020 | Yutani | H04B 10/43 |
| 2021/0242937 | A1* | 8/2021 | Ye | H04B 10/07 |
| 2023/0028405 | A1 | 1/2023 | Malzahn et al. | |
| 2023/0061937 | A1* | 3/2023 | Osterberg | G06F 13/387 |
| 2024/0297715 | A1* | 9/2024 | Wang | H04B 10/40 |

* cited by examiner

SWITCH SYSTEM, SWITCH APPARATUS, AND LINEAR DRIVE PLUGGABLE OPTICS APPARATUS

BACKGROUND OF THE DISCLOSURE

Technical Field

The present disclosure relates to a switch and an optics apparatus, and especially relates to a switch system, a switch apparatus, and a linear drive pluggable optics apparatus.

Description of Related Art

A related art switch system includes a related art switch apparatus and a plurality of optical modules. The optical modules plug into the related art switch apparatus. Each of the optical modules includes a related art digital signal processor. Because each of the optical modules includes the related art digital signal processor, once the optical module plugs into the related art switch apparatus, the optical module uses the related art digital signal processor in the optical module to work.

Because each of the optical modules includes the related art digital signal processor, if the related art switch system includes 32 optical modules, there are 32 related art digital signal processors in the related art switch system. However, because the power consumption of the related art digital signal processor is very high, the power consumption of the related art switch system is also very high; this problem needs to be solved urgently.

SUMMARY OF THE DISCLOSURE

In order to solve the above-mentioned problems, an object of the present disclosure is to provide a switch system.

In order to solve the above-mentioned problems, another object of the present disclosure is to provide a switch apparatus.

In order to solve the above-mentioned problems, still another object of the present disclosure is to provide a linear drive pluggable optics apparatus.

In order to achieve the object of the present disclosure mentioned above, the switch system of the present disclosure includes a switch apparatus and a linear drive pluggable optics apparatus. The switch apparatus includes a digital signal processor and a lookup table. The linear drive pluggable optics apparatus plugs into the switch apparatus. Moreover, the linear drive pluggable optics apparatus includes a microprocessor. The microprocessor is electrically connected to the digital signal processor. The microprocessor is configured to transmit an identification code to the digital signal processor. The digital signal processor is configured to search the lookup table for an optoelectronic parameter corresponding to a connection port number of the linear drive pluggable optics apparatus and the identification code. The digital signal processor is configured to transmit the optoelectronic parameter to the microprocessor. The microprocessor is configured to control the linear drive pluggable optics apparatus with the optoelectronic parameter.

Moreover, in an embodiment of the switch system of the present disclosure mentioned above, the switch apparatus further includes a connection port electrically connected to the digital signal processor. Moreover, the linear drive pluggable optics apparatus plugs into the connection port. The microprocessor is electrically connected to the digital signal processor through the connection port. The microprocessor is configured to transmit the identification code to the digital signal processor through the connection port. The digital signal processor is configured to transmit the optoelectronic parameter to the microprocessor through the connection port.

Moreover, in an embodiment of the switch system of the present disclosure mentioned above, the linear drive pluggable optics apparatus is configured to transmit a digital diagnostic monitoring data to the digital signal processor. The digital signal processor is configured to determine whether the digital diagnostic monitoring data is within a specification. In response to the digital diagnostic monitoring data not being within the specification, the digital signal processor is configured to adjust the optoelectronic parameter to obtain an adjusted optoelectronic parameter and transmit the adjusted optoelectronic parameter to the microprocessor. The digital diagnostic monitoring data includes a temperature data, a transmitting optical power data, a receiving optical power data, a voltage data, and a current data. The optoelectronic parameter includes a transmitting optical power parameter, a laser operating voltage parameter, and a laser operating current parameter.

Moreover, in an embodiment of the switch system of the present disclosure mentioned above, the linear drive pluggable optics apparatus further includes a light source driver and a transimpedance amplifier. The light source driver is electrically connected to the microprocessor. The transimpedance amplifier is electrically connected to the microprocessor. Moreover, the microprocessor is configured to store the optoelectronic parameter. The microprocessor is configured to control the light source driver and the transimpedance amplifier with the optoelectronic parameter.

Moreover, in an embodiment of the switch system of the present disclosure mentioned above, the switch system includes a plurality of the linear drive pluggable optics apparatuses. Moreover, the switch apparatus includes a plurality of the connection ports. Each of the linear drive pluggable optics apparatuses is configured to transmit the identification code to the digital signal processor to obtain the optoelectronic parameter.

In order to achieve the another object of the present disclosure mentioned above, the switch apparatus of the present disclosure is applied to a linear drive pluggable optics apparatus. The linear drive pluggable optics apparatus plugs into the switch apparatus. The linear drive pluggable optics apparatus includes a microprocessor. The microprocessor transmits an identification code to the switch apparatus. The switch apparatus includes a lookup table and a digital signal processor. The digital signal processor is electrically connected to the microprocessor. Moreover, the digital signal processor is configured to search the lookup table for an optoelectronic parameter corresponding to a connection port number of the linear drive pluggable optics apparatus and the identification code. The digital signal processor is configured to transmit the optoelectronic parameter to the microprocessor.

Moreover, in an embodiment of the switch apparatus of the present disclosure mentioned above, the switch apparatus further includes a connection port electrically connected to the digital signal processor. Moreover, the linear drive pluggable optics apparatus plugs into the connection port. The digital signal processor is electrically connected to the microprocessor through the connection port. The digital signal processor is configured to receive the identification code transmitted by the microprocessor through the connection port. The digital signal processor is configured to transmit the optoelectronic parameter to the microprocessor through the connection port.

Moreover, in an embodiment of the switch apparatus of the present disclosure mentioned above, the linear drive pluggable optics apparatus transmits a digital diagnostic monitoring data to the digital signal processor. The digital signal processor is configured to determine whether the digital diagnostic monitoring data is within a specification. In response to the digital diagnostic monitoring data not being within the specification, the digital signal processor is configured to adjust the optoelectronic parameter to obtain an adjusted optoelectronic parameter and transmit the adjusted optoelectronic parameter to the microprocessor. The digital diagnostic monitoring data includes a temperature data, a transmitting optical power data, a receiving optical power data, a voltage data, and a current data. The optoelectronic parameter includes a transmitting optical power parameter, a laser operating voltage parameter, and a laser operating current parameter.

In order to achieve the still another object of the present disclosure mentioned above, the linear drive pluggable optics apparatus of the present disclosure is applied to a switch apparatus. The linear drive pluggable optics apparatus plugs into the switch apparatus. The switch apparatus includes a digital signal processor and a lookup table. The linear drive pluggable optics apparatus includes a microprocessor. The microprocessor is electrically connected to the digital signal processor. Moreover, the microprocessor is configured to transmit an identification code to the digital signal processor. The digital signal processor searches the lookup table for an optoelectronic parameter corresponding to a connection port number of the linear drive pluggable optics apparatus and the identification code. The digital signal processor transmits the optoelectronic parameter to the microprocessor. The microprocessor is configured to control the linear drive pluggable optics apparatus with the optoelectronic parameter.

Moreover, in an embodiment of the linear drive pluggable optics apparatus of the present disclosure mentioned above, the linear drive pluggable optics apparatus further includes a light source driver and a transimpedance amplifier. The light source driver is electrically connected to the microprocessor. The transimpedance amplifier is electrically connected to the microprocessor. Moreover, the microprocessor is configured to store the optoelectronic parameter. The microprocessor is configured to control the light source driver and the transimpedance amplifier with the optoelectronic parameter. The optoelectronic parameter includes a transmitting optical power parameter, a laser operating voltage parameter, and a laser operating current parameter.

The advantage of the present disclosure is to reduce the power consumption of the switch system.

Please refer to the detailed descriptions and figures of the present disclosure mentioned below for further understanding technologies, methods, and effects and achieving the predetermined purposes of the present disclosure. Further, the purposes, characteristics, and features of the present disclosure may be more deeply and specifically understood. However, the drawings are provided only for references and descriptions and not intended to limit the scope of the present disclosure.

DETAILED DESCRIPTION

In the present disclosure, numerous specific details are provided, to provide a comprehensive understanding of embodiments of the present disclosure. However, those skilled in the art may understand that the present disclosure may be practiced without one or more of these specific details. In other instances, well-known details are not shown or described to avoid obscuring features of the present disclosure. The technical content and the detailed description of the present disclosure are as follows with reference to the figures.

Figure 1:
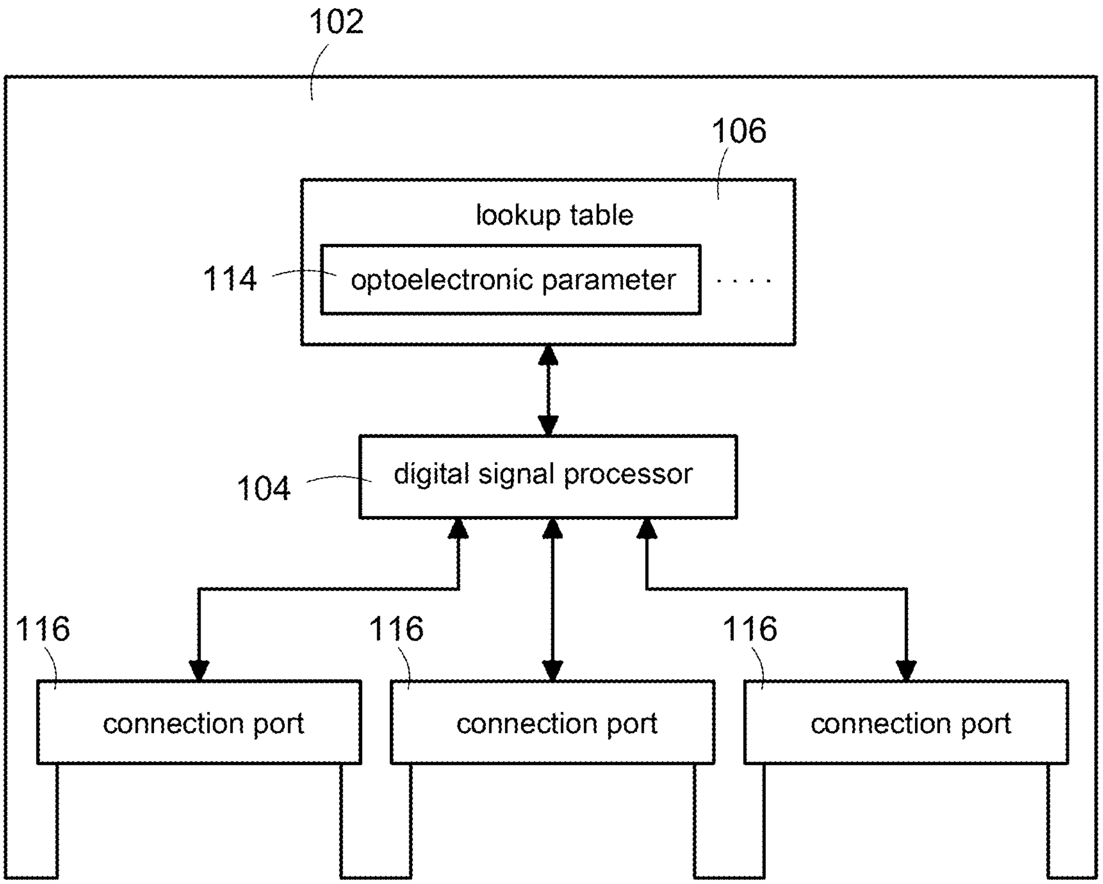
FIG. 1 shows a block diagram of a switch apparatus of the present disclosure.
Figure 2:
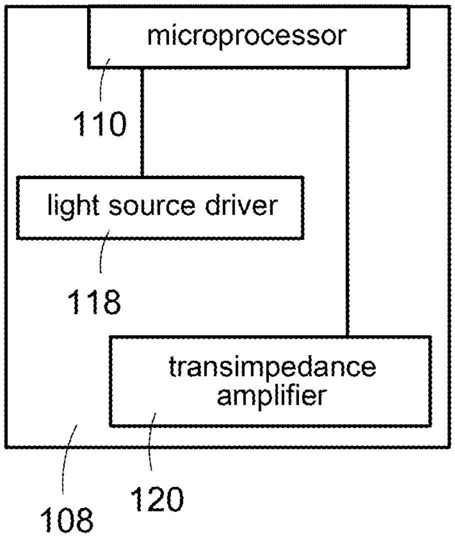
FIG. 2 shows a block diagram of a linear drive pluggable optics apparatus of the present disclosure.
Figure 3:
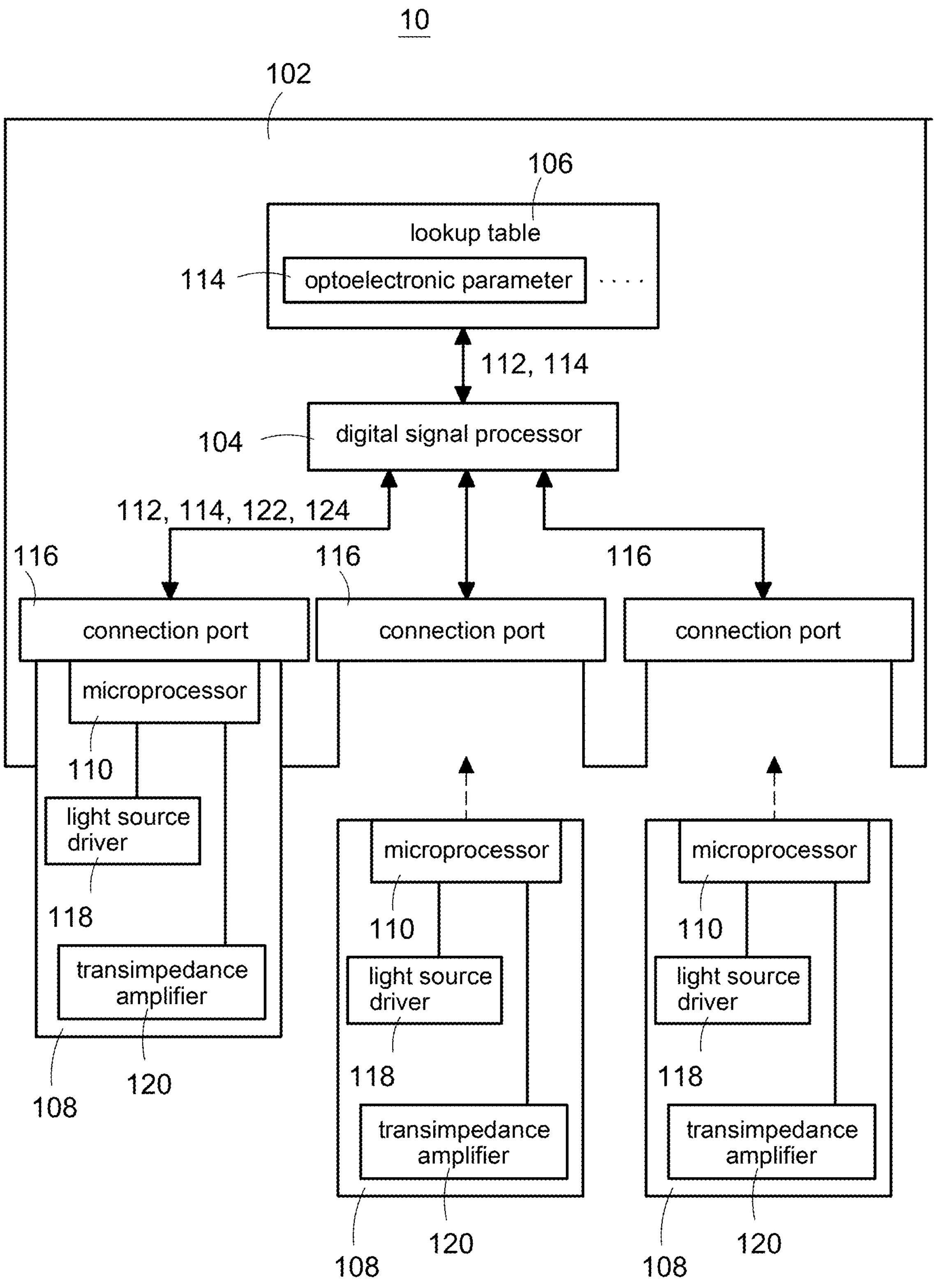
FIG. 3 shows a block diagram of a switch system of the present disclosure.

FIG. 1 shows a block diagram of a switch apparatus 102 of the present disclosure. FIG. 2 shows a block diagram of a linear drive pluggable optics (commonly referred to as LPO) apparatus 108 of the present disclosure. FIG. 3 shows a block diagram of a switch system 10 of the present disclosure. Please refer to FIG. 1, FIG. 2, and FIG. 3 at the same time.

As shown in FIG. 3, the switch system 10 of the present disclosure includes a switch apparatus 102 and a plurality of linear drive pluggable optics apparatuses 108. The switch apparatus 102 includes a digital signal processor 104, a lookup table 106, and a plurality of connection ports 116. Each of the linear drive pluggable optics apparatuses 108 includes a microprocessor 110, a light source driver 118, and a transimpedance amplifier (commonly referred to as TIA) 120.

The connection ports 116 are electrically connected to the digital signal processor 104. The microprocessor 110 is electrically connected to the light source driver 118 and the transimpedance amplifier 120. The linear drive pluggable optics apparatus 108 plugs into the connection port 116, so that the microprocessor 110 is electrically connected to the digital signal processor 104 through the connection port 116.

When the linear drive pluggable optics apparatus 108 plugs into the connection port 116 (for example, when the first linear drive pluggable optics apparatus 108 from left to right in FIG. 3 plugs into the first connection port 116 from left to right in FIG. 3), the microprocessor 110 is configured to transmit an identification code 112 to the digital signal processor 104 through the connection port 116, wherein the identification code 112 includes, for examples but not limited to, a manufacturer name and a product model.

Then, the digital signal processor 104 is configured to search the lookup table 106 for an optoelectronic parameter 114 corresponding to a connection port number 124 of the linear drive pluggable optics apparatus 108 and the manufacturer name and the product model of the identification code 112. The connection port number 124 represents the number of the connection port 116 where the linear drive pluggable optics apparatus 108 plugs. The digital signal processor 104 must know which of the connection ports 116 the linear drive pluggable optics apparatus 108 plugs into. The optoelectronic parameter 114 includes, for examples but not limited to, a transmitting optical power parameter, a laser operating voltage parameter, a laser operating current parameter, and so on. The following table is a simple embodiment of the lookup table 106.

| connection | identification code | | optoelectronic parameter | | |
|---|---|---|---|---|---|
| | | | transmitting optical | laser operating | laser operating |
| port number | manufacturer name | product model | power parameter | voltage parameter | current parameter |
| 01 | first manufacturer | first product model | first parameter | second parameter | third parameter |
| 02 | first manufacturer | second product model | fourth parameter | fifth parameter | sixth parameter |
| 03 | second manufacturer | third product model | seventh parameter | eighth parameter | ninth parameter |

Following the above, if the linear drive pluggable optics apparatus 108 plugs into the connection port 116 numbered 01, and if the manufacturer name is a first manufacturer, and if the product model is a first product model, then the digital signal processor 104 searches in the lookup table 106 for the transmitting optical power parameter, the laser operating voltage parameter, and the laser operating current parameter corresponding to the connection port number 124 numbered 01, the manufacturer name which is the first manufacturer, and the product model which is the first product model. Namely, as shown in the above table, the transmitting optical power parameter, the laser operating voltage parameter, and the laser operating current parameter of the optoelectronic parameter 114 are searched as a first parameter, a second parameter, and a third parameter.

In other words, the specific connection port 116 has to be plugged into the linear drive pluggable optics apparatus 108 having the specific identification code 112. For example, the connection port 116 numbered 01 mentioned above has to be plugged into the linear drive pluggable optics apparatus 108 having the manufacturer name as the first manufacturer and the product model as the first product model. The reason is the compatibility of the switch apparatus 102 with the linear drive pluggable optics apparatus 108; the key lies in the linkage between the emitted light of the linear drive pluggable optics apparatus 108 and the digital signal processor 104; the parameter settings of the first manufacturer and the parameter settings of the second manufacturer may be different, and therefore the linear drive pluggable optics apparatus 108 having any identification code 112 plugging into the connection port 116 numbered 01 may not work properly. Namely, the identification code 112 is similar to a key and may determine whether the connection port 116 is conducted.

In one embodiment of the present disclosure (but the embodiment is not limiting the present disclosure), the lookup table 106 may be pre-filled and stored in the switch apparatus 102, and if the digital signal processor 104 cannot find the corresponding connection port number 124, the corresponding manufacturer name, or the corresponding product model, then the switch apparatus 102 provides a warning. For example, taking the above table as an example, if the connection port number 124 is 01 but the manufacturer name is a second manufacturer, then the switch apparatus 102 provides the warning. For another example, taking the above table as an example, if the connection port number 124 is 02 but the product model is a third product model, then the switch apparatus 102 provides the warning.

Then, the digital signal processor 104 is configured to transmit the optoelectronic parameter 114 to the microprocessor 110 through the connection port 116. Namely, the digital signal processor 104 is configured to inform the microprocessor 110 of the optoelectronic parameter 114 through the connection port 116. In other words, the digital signal processor 104 is configured to write the optoelectronic parameter 114 into the microprocessor 110 through the connection port 116.

Then, the microprocessor 110 is configured to store the optoelectronic parameter 114, and the microprocessor 110 is configured to control the light source driver 118, the transimpedance amplifier 120, and other conventional components (which are not shown in FIG. 2 or FIG. 3, and which belong to the conventional linear drive pluggable optics) with the optoelectronic parameter 114. Namely, the microprocessor 110 is configured to use the optoelectronic parameter 114 to control the light source driver 118, the transimpedance amplifier 120, and other conventional components (which are not shown in FIG. 2 or FIG. 3, and which belong to the conventional linear drive pluggable optics).

Finally, in order to verify whether the linear drive pluggable optics apparatus 108 is driven correctly, the linear drive pluggable optics apparatus 108 is configured to transmit a digital diagnostic monitoring (commonly referred to as DDM) data 122 to the digital signal processor 104. The digital signal processor 104 is configured to determine whether the digital diagnostic monitoring data 122 is within a specification. In response to the digital diagnostic monitoring data 122 not being within the specification (namely, if the digital diagnostic monitoring data 122 is not within the specification), the digital signal processor 104 is configured to adjust the optoelectronic parameter 114 to obtain an adjusted optoelectronic parameter and transmit the adjusted optoelectronic parameter to the microprocessor 110 (namely, the digital signal processor 104 is configured to adjust the optoelectronic parameter 114 and transmit the optoelectronic parameter 114 (which is adjusted) to the microprocessor 110), and then the linear drive pluggable optics apparatus 108 transmits the digital diagnostic monitoring data 122 to the digital signal processor 104 again.

The digital diagnostic monitoring data 122 includes, for examples but not limited to, a temperature data, a transmitting optical power data, a receiving optical power data, a voltage data, a current data, and so on. If the digital diagnostic monitoring data 122 is determined to be within the specification, the linear drive pluggable optics apparatus 108 is determined to be driven correctly. If the number of times that the digital signal processor 104 adjusts the optoelectronic parameter 114 exceeds a predetermined number of times but the digital diagnostic monitoring data 122 is still not within the specification, the digital diagnostic monitoring data 122 is determined to be abnormal.

After the first linear drive pluggable optics apparatus 108 from left to right in FIG. 3 completes the above operation process, each of the remaining linear drive pluggable optics apparatuses 108 in FIG. 3 is also be configured to transmit the identification code 112 to the digital signal processor 104 to sequentially obtain the optoelectronic parameter 114, and the digital diagnostic monitoring data 122 is also be determined whether the digital diagnostic monitoring data 122 is within the specification (namely, the above operation process is repeated).

Please refer to FIG. 3 again. The switch apparatus 102 of the present disclosure is applied to a plurality of linear drive pluggable optics apparatuses 108. The switch apparatus 102 includes a lookup table 106, a digital signal processor 104, and a plurality of connection ports 116. Each of the linear drive pluggable optics apparatuses 108 includes a microprocessor 110, a light source driver 118, and a transimpedance amplifier 120.

The connection ports 116 are electrically connected to the digital signal processor 104. The linear drive pluggable optics apparatus 108 plugs into the connection port 116, so that the digital signal processor 104 is electrically connected to the microprocessor 110 through the connection port 116.

The microprocessor 110 transmits an identification code 112 to the switch apparatus 102; namely, the digital signal processor 104 receives the identification code 112 transmitted by the microprocessor 110 through the connection port 116. The digital signal processor 104 is configured to search in the lookup table 106 for an optoelectronic parameter 114 corresponding to a connection port number 124 of the linear drive pluggable optics apparatus 108 and the identification code 112. The digital signal processor 104 is configured to transmit the optoelectronic parameter 114 to the microprocessor 110 through the connection port 116.

The linear drive pluggable optics apparatus 108 transmits a digital diagnostic monitoring data 122 to the digital signal processor 104. The digital signal processor 104 is configured to determine whether the digital diagnostic monitoring data 122 is within a specification. In response to the digital diagnostic monitoring data 122 not being within the specification, the digital signal processor 104 is configured to adjust the optoelectronic parameter 114 to obtain an adjusted optoelectronic parameter and transmit the adjusted optoelectronic parameter to the microprocessor 110. The digital diagnostic monitoring data 122 includes a temperature data, a transmitting optical power data, a receiving optical power data, a voltage data, and a current data. The optoelectronic parameter 114 includes a transmitting optical power parameter, a laser operating voltage parameter, and a laser operating current parameter.

The remaining technical contents of the switch apparatus 102 of the present disclosure are the same as the technical contents of the switch system 10 of the present disclosure mentioned above, and therefore are not described again.

Please refer to FIG. 3 again. The linear drive pluggable optics apparatus 108 of the present disclosure is applied to a switch apparatus 102. The linear drive pluggable optics apparatus 108 includes a microprocessor 110, a light source driver 118, and a transimpedance amplifier 120. The switch apparatus 102 includes a digital signal processor 104 and a lookup table 106.

The microprocessor 110 is electrically connected to the light source driver 118 and the transimpedance amplifier 120. The linear drive pluggable optics apparatus 108 plugs into the switch apparatus 102, so that the microprocessor 110 is electrically connected to the digital signal processor 104.

The microprocessor 110 is configured to transmit an identification code 112 to the digital signal processor 104. The digital signal processor 104 searches the lookup table 106 for an optoelectronic parameter 114 corresponding to a connection port number 124 of the linear drive pluggable optics apparatus 108 and the identification code 112. The digital signal processor 104 transmits the optoelectronic parameter 114 to the microprocessor 110. The microprocessor 110 is configured to store the optoelectronic parameter 114. The microprocessor 110 is configured to control the light source driver 118 and the transimpedance amplifier 120 with the optoelectronic parameter 114. The optoelectronic parameter 114 includes a transmitting optical power parameter, a laser operating voltage parameter, and a laser operating current parameter.

The remaining technical contents of the linear drive pluggable optics apparatus 108 of the present disclosure are the same as the technical contents of the switch system 10 of the present disclosure mentioned above, and therefore are not described again.

In the present disclosure, it should be noted that the switch apparatus 102 and the linear drive pluggable optics apparatus 108 of the present disclosure mentioned above must include other conventional components (which are not shown in FIG. 1, FIG. 2, or FIG. 3, and which belong to the conventional switch and the conventional linear drive pluggable optics), to maintain the conventional operations of the switch apparatus 102 and the linear drive pluggable optics apparatus 108. In order to avoid obscuring the features of the present disclosure, the conventional components are not described here.

The switch apparatus 102 may also include a plurality of the digital signal processors 104 (for example, four digital signal processors 104) to correspond to the linear drive pluggable optics apparatuses 108. For example, if the switch system 10 includes thirty-two linear drive pluggable optics apparatuses 108, then one digital signal processor 104 corresponds to eight linear drive pluggable optics apparatuses 108.

The advantage of the present disclosure is to reduce the power consumption of the switch system 10. The linear drive pluggable optics apparatuses 108 of the present disclosure may share the digital signal processor 104 through the lookup table 106 to work, so that the power consumption of the switch system 10 of the present disclosure may be greatly reduced. In addition to being applied to the linear drive pluggable, the present disclosure may also be applied to the co-packaged optics (commonly referred to as CPO).

Although the present disclosure has been described with reference to the embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure.

What is claimed is:

1. A switch system (10) comprising:

a switch apparatus (102) comprising a digital signal processor (104) and a lookup table (106); and a linear drive pluggable optics apparatus (108) plugging into the switch apparatus (102), wherein the linear drive pluggable optics apparatus (108) comprises a microprocessor (110) electrically connected to the digital signal processor (104); the microprocessor (110) is configured to transmit an identification code (112) to the digital signal processor (104); the digital signal processor (104) is configured to search the lookup table (106) for an optoelectronic parameter (114) corresponding to a connection port number (124) of the linear drive pluggable optics apparatus (108) and the identification code (112); the digital signal processor (104) is configured to transmit the optoelectronic parameter (114) to the microprocessor (110); the microprocessor (110) is configured to control the linear drive pluggable optics apparatus (108) with the optoelectronic parameter (114);

wherein the switch apparatus (102) further comprises a connection port (116) electrically connected to the digital signal processor (104);

wherein the linear drive pluggable optics apparatus (108) plugs into the connection port (116); the microprocessor (110) is electrically connected to the digital signal processor (104) through the connection port (116); the microprocessor (110) is configured to transmit the identification code (112) to the digital signal processor (104) through the connection port (116); the digital signal processor (104) is configured to transmit the optoelectronic parameter (114) to the microprocessor (110) through the connection port (116);

wherein the linear drive pluggable optics apparatus (108) is configured to transmit a digital diagnostic monitoring data (122) to the digital signal processor (104); the digital signal processor (104) is configured to determine whether the digital diagnostic monitoring data (122) is within a specification; in response to the digital diagnostic monitoring data (122) not being within the specification, the digital signal processor (104) is configured to adjust the optoelectronic parameter (114) to obtain an adjusted optoelectronic parameter and transmit the adjusted optoelectronic parameter to the microprocessor (110); the digital diagnostic monitoring data (122) comprises a temperature data, a transmitting optical power data, a receiving optical power data, a voltage data, and a current data; the optoelectronic parameter (114) comprises a transmitting optical power parameter, a laser operating voltage parameter, and a laser operating current parameter.

2. The switch system (10) of claim 1, wherein the linear drive pluggable optics apparatus (108) further comprises:

a light source driver (118) electrically connected to the microprocessor (110); and a transimpedance amplifier (120) electrically connected to the microprocessor (110), wherein the microprocessor (110) is configured to store the optoelectronic parameter (114); the microprocessor (110) is configured to control the light source driver (118) and the transimpedance amplifier (120) with the optoelectronic parameter (114).

3. The switch system (10) of claim 2, the switch system (10) comprising a plurality of the linear drive pluggable optics apparatuses (108), wherein the switch apparatus (102) comprises a plurality of the connection ports (116); each of the linear drive pluggable optics apparatuses (108) is configured to transmit the identification code (112) to the digital signal processor (104) to obtain the optoelectronic parameter (114).

4. A switch apparatus (102) applied to a linear drive pluggable optics apparatus (108), the linear drive pluggable optics apparatus (108) plugging into the switch apparatus (102), the linear drive pluggable optics apparatus (108) comprising a microprocessor (110), the microprocessor (110) transmitting an identification code (112) to the switch apparatus (102), the switch apparatus (102) comprising:

a lookup table (106);

a digital signal processor (104) electrically connected to the microprocessor (110); and a connection port (116) electrically connected to the digital signal processor (104), wherein the digital signal processor (104) is configured to search the lookup table (106) for an optoelectronic parameter (114) corresponding to a connection port number (124) of the linear drive pluggable optics apparatus (108) and the identification code (112); the digital signal processor (104) is configured to transmit the optoelectronic parameter (114) to the microprocessor (110);

wherein the linear drive pluggable optics apparatus (108) plugs into the connection port (116); the digital signal processor (104) is electrically connected to the microprocessor (110) through the connection port (116); the digital signal processor (104) is configured to receive the identification code (112) transmitted by the microprocessor (110) through the connection port (116); the digital signal processor (104) is configured to transmit the optoelectronic parameter (114) to the microprocessor (110) through the connection port (116);

wherein the linear drive pluggable optics apparatus (108) transmits a digital diagnostic monitoring data (122) to the digital signal processor (104); the digital signal processor (104) is configured to determine whether the digital diagnostic monitoring data (122) is within a specification; in response to the digital diagnostic monitoring data (122) not being within the specification, the digital signal processor (104) is configured to adjust the optoelectronic parameter (114) to obtain an adjusted optoelectronic parameter and transmit the adjusted optoelectronic parameter to the microprocessor (110); the digital diagnostic monitoring data (122) comprises a temperature data, a transmitting optical power data, a receiving optical power data, a voltage data, and a current data; the optoelectronic parameter (114) comprises a transmitting optical power parameter, a laser operating voltage parameter, and a laser operating current parameter.

* * * * *